(No Model.) 3 Sheets—Sheet 1.

P. PFLEIDERER.
MACHINE FOR MIXING, KNEADING, OR OTHERWISE TREATING PLASTIC MASSES.

No. 534,968. Patented Feb. 26, 1895.

Witnesses
J. F. Coleman
E. A. Kimmel

Inventor
Paul Pfleiderer
by W. N. Kimmel
his atty.

THE NORRIS PETERS CO., PHOTO-LITHO., WASHINGTON, D. C.

(No Model.) 3 Sheets—Sheet 2.

P. PFLEIDERER.
MACHINE FOR MIXING, KNEADING, OR OTHERWISE TREATING PLASTIC MASSES.

No. 534,968. Patented Feb. 26, 1895.

Witnesses
Inventor
Paul Pfleiderer (No Model.) 3 Sheets—Sheet 3.
P. PFLEIDERER.
MACHINE FOR MIXING, KNEADING, OR OTHERWISE TREATING
PLASTIC MASSES.

No. 534,968. Patented Feb. 26, 1895.

Witnesses
J. F. Coleman
E. A. Zinkeil

Inventor
Paul Pfleiderer
by Wm. N. Zinkeil
his Atty.

THE NORRIS PETERS CO., PHOTO-LITHO., WASHINGTON, D. C.

UNITED STATES PATENT OFFICE.

PAUL PFLEIDERER, OF LONDON, ENGLAND.

MACHINE FOR MIXING, KNEADING, OR OTHERWISE TREATING PLASTIC MASSES.

SPECIFICATION forming part of Letters Patent No. 534,968, dated February 26, 1895.

Application filed May 7, 1894. Serial No. 510,383. (No model.)

*To all whom it may concern:*

Be it known that I, PAUL PFLEIDERER, a subject of the German Emperor, residing at London, in the county of Middlesex, England, have invented a certain new and useful Improvement in Machines for Mixing, Kneading, or otherwise Treating Plastic Masses, of which the following is a full, clear, and exact description.

This invention has for its object to improve and modify the system or fundamental principle of the construction, arrangement and operation of the blades or mixers of machines for mixing, kneading or otherwise treating dough and other plastic or semi-fluid masses, and more particularly of my universal kneading and mixing machine, patented in the United States February 21, 1882, No. 254,042.

The invention consists, first, in providing the blades or mixers with perimetrical gaps of large size and unequal and unsymmetrical dimensions in order to afford clearance for the material being worked and to facilitate its working.

The invention also consists in a pair of blades, (with equal or unequal gaps,) arranged out of alignment transversely in the mixer box or trough and having end scrapers, or an endwise movement; and under this second part of my invention I show a number of modifications for accomplishing the same purpose, namely, the working of the mass throughout the box or trough.

The third part of my invention consists in a pair of blades mounted in a box or trough and operated individually.

Figure 1:
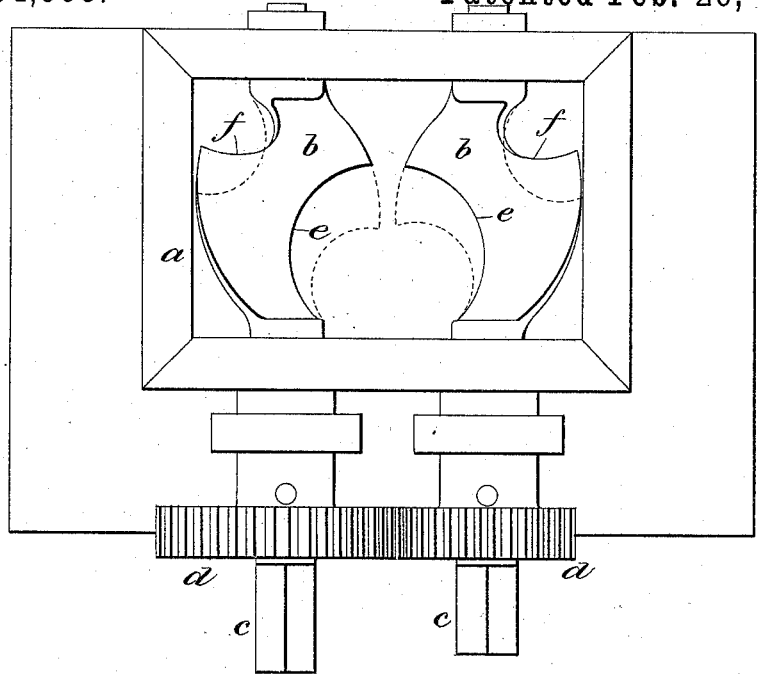
Figure 2:
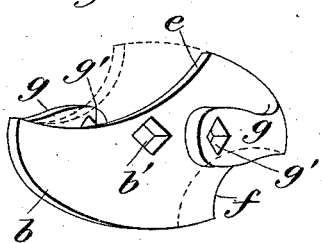
Figure 3:
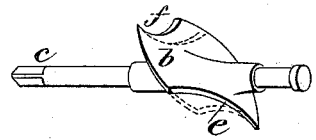
Figure 4:
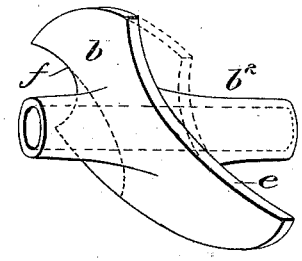
Figure 5:
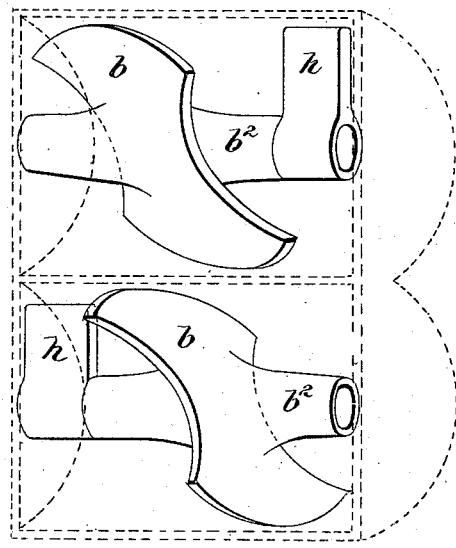
Figure 6:
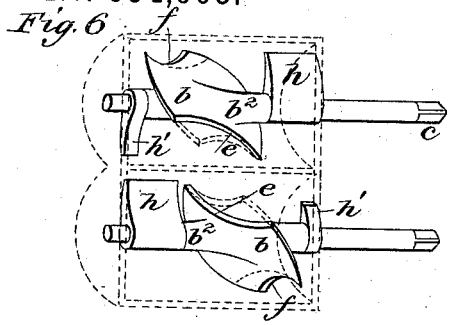
Figure 7:
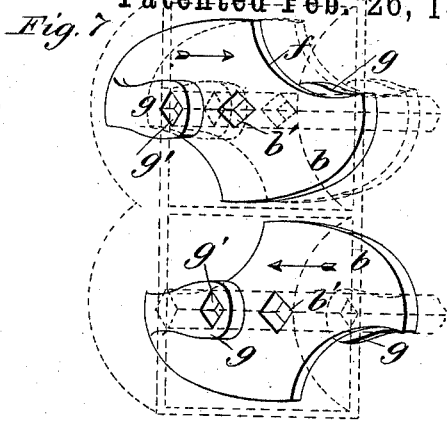
Figure 8:
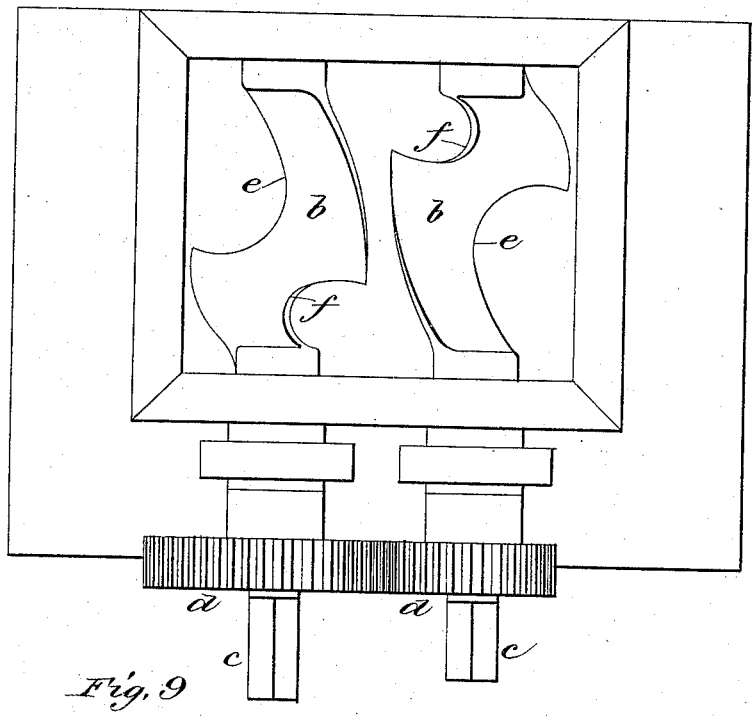
Figure 9:
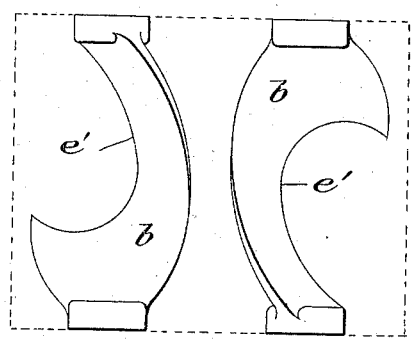
Figure 10:
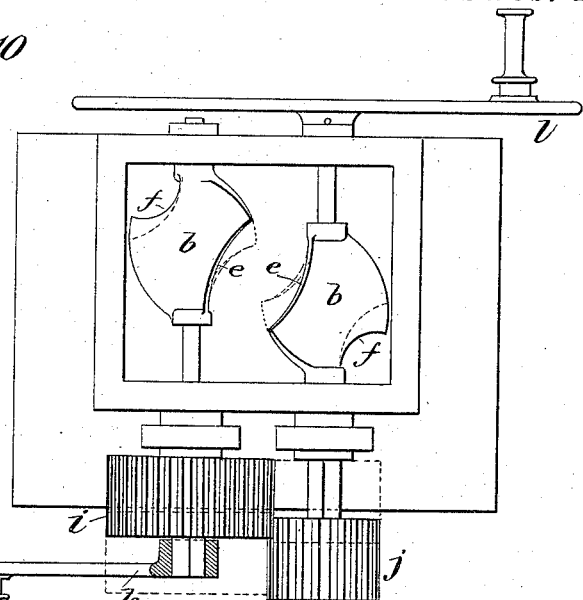
Figure 11:
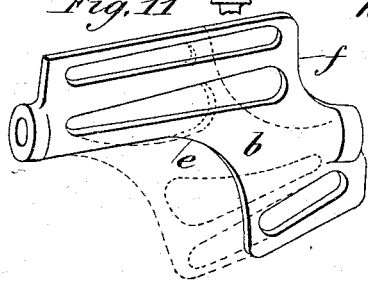
Figure 12:
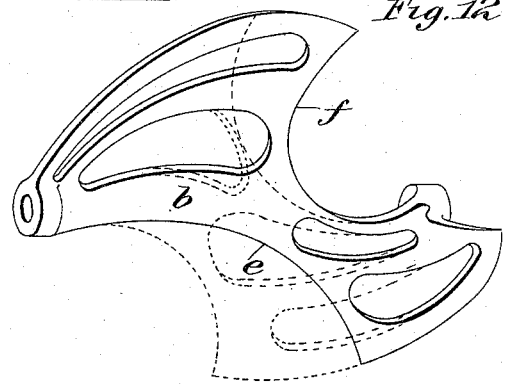
Figure 13:
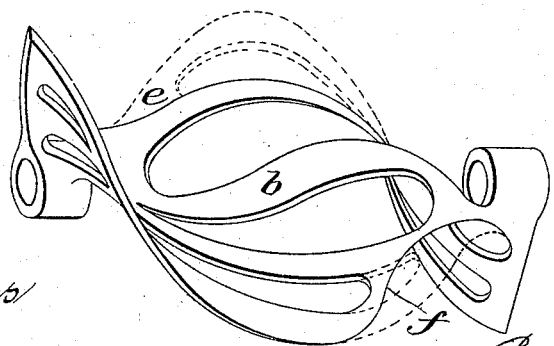

In the accompanying drawings illustrating my invention, in the several figures of which like parts are similarly designated, Figure 1 is a plan view of a machine showing one form of my invention. Figs. 2, 3 and 4 are perspective views of three several forms of blades, these, Figs. 1, 2, 3 and 4, showing by dotted lines the alteration in the construction of the gaps over the old form. Fig. 5 is a perspective view of a mixing machine showing an old form of blades with end scrapers at one end only of each blade. Fig. 6 is a perspective view of a mixing machine showing the new form of blades with scrapers at both ends of both blades. Fig. 7 is a perspective view of a machine having axially slidable blades for accomplishing the same purpose as the scrapers in Figs. 5 and 6. Fig. 8 is a plan view of a mixer showing a modification in the arrangement of the gaps. Fig. 9 is a plan view of portions of a machine showing each blade having a single large gap, the gaps being at opposite ends of the respective blades. Fig. 10 is a plan view of a mixer having means for independently operating the two blades. Figs. 11, 12 and 13 are perspective views of skeleton, perforated or open-work blades constructed with the large and unequal gaps, the dotted lines representing the old forms.

In Fig. 1, $a$ is a box or trough of any approved construction and adapted to contain the plastic or other mass to be treated by the blades $b, b$. These blades are mounted upon shafts $c, c$, having bearings in the box, and said shafts may be geared together by differential gearing $d, d$, both of the shafts being constructed so that either may be used as the driving shaft. For reasons hereinbefore indicated and hereinafter stated at large, I make gaps $e, f$, in the perimeters of these blades, of large size and unequal and unsymmetrical dimensions. These gaps may be made on opposite sides of the axial centers of the blades and at opposite ends, and similar gaps may be at similar ends, as in Fig. 1, or they may be at opposite ends of the respective blades, as in Fig. 8; and as also shown in Figs. 8 and 9, the gaps may extend across the axial centers. Fig. 2 shows a blade made separate from its shaft and having arms $g$ at its ends which are provided with holes $g'$, $g'$, which are aligned with a hole $b'$ in the body of the blade to receive a shaft. Fig. 3 shows a blade cast with its shaft or otherwise permanently applied thereto, and Fig. 4 shows a blade similar to that shown in Fig. 3, but with a hub $b^2$ by means of which it may be applied to a shaft. In all of these figures (1 to 4) the new and improved construction of gaps is shown by the full lines, while the old construction is indicated by the broken lines. All of these blades and also all those hereinafter described are constructed in the preferred form as segmental ellipses, generated from an oblique section of a cylinder, but I do not wish to be understood as limiting my invention with any degree of mathematical or geometrical exactitude to that figure.

In some cases it may be desirable to use a trough or box of greater length than the extreme length of the blades, and in order to lengthen out the blades so as to reach and act upon the whole contents of the box, I may add scrapers $h$ at opposite ends of the respective blades, as in Fig. 5, thereby throwing the blades out of transverse alignment and insuring the desired action upon the whole mass of material being treated; or, as shown in Fig. 6, the blades may be arranged out of alignment and scrapers $h$, $h'$ of different widths in the direction of the axis of rotation, may be arranged alternately at opposite ends of each blade. These scrapers may be loosely or fixedly arranged upon the shafts of the blades. A similar result may be obtained by mounting the blades upon their shafts so as to rotate therewith and also slide longitudinally thereon, as is illustrated in Fig. 7. In the case of the constructions shown in Figs. 5, 6 and 7, the old or the new constructions of gapped blades may be used, the old being shown in Figs. 5 and 7 and the new in Fig. 6, for illustration.

It is within my invention, also, to use a single large gap in each blade, as shown in Fig. 9, wherein the gap $e'$ extends from the hub at one end nearly to the hub at the other end and across the axial center of the blade.

One of the simplest constructions of my machine which is most suitable for domestic use and for all purposes where greatest simplicity and cheapness coupled with one or other or all of the advantages incident to my invention, consists in one or other of my blades or any other suitable blade revolving in a trough or box of greater length than the blades so that the blades may have a longitudinal movement therein by virtue of their shafts being set in bearings so as not only to revolve but to slide longitudinally; and in this particular, this form of my invention is the alternative of the construction shown in Fig. 7, where the blades slide on their shafts instead of the shafts sliding in their bearings. The movements of the blades in either case serve to enable the blades periodically to scrape the sides and bottom of the trough in all parts. Such blades are combined with one or more gears or pinions $i$, $j$, Fig. 10, of different width (axially), driven by a hand-crank $k$ or fly wheel $l$, or by a suitable belt from a line shaft where convenient. In this arrangement, the blades, as it were, find their positions of least resistance automatically, or the operators find them out by feeling the resistance, while they have it, at the same time, in their power and control to move the blades axially as required for scraping the sides or walls of the trough or mixing box, no wheel gearing being required for purposes of mechanically or automatically sliding the blades axially. If the spur wheels or pinions $i, j$, be removed, one man with two hands can drive both blades in either direction, at different or equal speeds, by a handle $k$ or fly wheel $l$ on each shaft, or two persons can drive simultaneously. The blades should be run toward or from each other, at different speeds, so far as is practicable and convenient.

Figs. 11, 12 and 13 show three several forms of perforated or open-work or skeleton blades, the full lines indicating my improved gapping and the dotted or broken lines indicating the old form of gapping, but while for some purposes the perforated blades may be desirable, I believe the best results will be attained by the imperforate and gapped blades.

From Fig. 1, it will be seen that if the machine were driven in one direction only, the material would gradually be propelled toward and heaped up near one side or end or the other according to direction of rotation of the blades. This phenomenon may be utilized for emptying and clearing the machine intermittently or continuously; but, when preferred, this heaping up of the material may be obviated by driving or running the blades alternately in opposite directions. Fig. 8 shows a form of my machine admirably adapted for emptying and clearing.

While I have shown and described my invention as used in connection with a two-blade machine, I wish to be understood as including as within my invention one or more blades as may be required for the work to be done. In all of the blades these two main and essential features are present, namely, an increased accessibility of parts, and a reduction to a minimum of the more or less objectionable transverse solid portion.

The main advantages of my invention are, first, the possibility of increasing the capacity of the trough and thereby treating a larger quantity of material with equal efficiency and thoroughness without increasing the driving power required for the machine; second, the equalization of the resistance offered during the various phases of the mixing and kneading operation; third, the increased facility and accessibility for cleaning and controlling the working parts and bearing surfaces; fourth, the possibility of continuous or intermittent working and discharging without any additional worms or other propellers, and even without the necessity in every case of tilting the trough, by the mere action of the mixing blades, and without having to impair their most efficient mixing and kneading shape for purposes of emptying; fifth, the absolute freedom from danger to life and limb in consequence of the absence, from the domestic machine particularly, of all wheel gearing or mechanism of any kind.

I wish to state in conclusion, that I do not limit my invention to its use with plastic, semi-fluid or similar masses, since it is obvious that it may be used for mixing and otherwise treating dry or other pulverulent matter, liquids, &c., as well.

What I claim is—

1. A blade for mixing, kneading and such like machines, having its perimeter supplied with a deep gap extending transversely inward toward the axial center of the blade and beginning at or near one end and ending short of the other end, the full width of the stock or body of the blade being preserved at the ungapped portion, substantially as described.

2. A blade for mixing, kneading and kindred machines, having its perimeter supplied with gaps of large size and unequal and unsymmetrical dimensions, substantially as described.

3. A blade for mixing, kneading and kindred machines, having its perimeter supplied with gaps of large size and unequal and unsymmetrical dimensions, and arranged upon opposite sides of the axial center of the blade and at opposite ends of such blade, substantially as described.

4. A machine for mixing, kneading and other purposes, comprising a pair of rotary blades having perimetrical gaps of large size and unequal and unsymmetrical dimensions, arranged at opposite sides and ends of the respective blades, the gaps alternating as to size at opposite ends of the respective blades, substantially as described.

5. In a machine for mixing, kneading and kindred purposes, the combination with a pair of perimetrically gapped blades, a mixing trough or box of greater length than the blades so as to leave spaces between the ends of the trough and the blades and means to bring the material in such end spaces within the influence of the blades, substantially as described.

6. In a machine for mixing, kneading and kindred purposes, the combination with a pair of perimetrically gapped blades, a mixing trough or box of greater length than the blades so as to leave spaces between the ends of the trough and the blades, and shafts for such blades having longitudinal movement in their bearings thereby to bring the material in such end spaces within the influence of the blades, substantially as described.

7. In a machine for mixing, kneading and kindred purposes, the combination with a mixing trough, box or container, of a number of mixing or kneading blades having perimetrical gaps of large size and unequal and unsymmetrical dimensions, and differential driving means, such as toothed gearing, for such blades, the gaps in and the varying speeds of the blades serving to produce in action an increased irregularity in the periodical recurrence of the mixing or kneading phenomena, and the occasional great resistance of the material under treatment being correspondingly reduced and approximated closely to the low average of motive power, substantially as described.

8. A blade for mixing, kneading and such like machines, having its perimeter supplied with a deep gap extending transversely inward toward the axial center of the blade and beginning at or near one end and ending short of the other end, the opposite edge of the blade being unsymmetrical with relation to the gapped edge, substantially as described.

In testimony whereof I have hereunto set my hand this 23d day of April, A. D. 1894.

PAUL PFLEIDERER.

Witnesses:
PIERCE J. GRACE,
*Vice and Deputy Consul - General of the United States of America at London, England.*
ALFRED NUTTING,
*Clerk, U. S. Consulate - General, London, England.*